United States Patent [19]

Swanson

[11] Patent Number: 5,295,602

[45] Date of Patent: Mar. 22, 1994

[54] HOUSING WITH SNAP LATCH CLOSURE

[75] Inventor: John S. Swanson, Flushing, Mich.

[73] Assignee: General Motors Corporation, Detroit, Mich.

[21] Appl. No.: 33,297

[22] Filed: Mar. 17, 1993

[51] Int. Cl.⁵ .......................................... B65D 45/16
[52] U.S. Cl. ................................. 220/306; 220/326
[58] Field of Search ............... 220/306, 326, 324, 354

[56] References Cited

U.S. PATENT DOCUMENTS

| | | | |
|---|---|---|---|
| 2,078,096 | 4/1937 | Parkin | 220/326 |
| 2,123,588 | 7/1938 | Lunteke | 220/326 |
| 2,792,961 | 5/1957 | Gordon | 220/326 |
| 3,307,603 | 3/1967 | Swett | 220/354 |
| 3,796,027 | 3/1974 | Gumtow . | |
| 3,840,152 | 10/1974 | Hodge | 220/326 |
| 3,843,013 | 10/1974 | Brooks, Jr. | 220/326 |
| 4,130,405 | 12/1978 | Akado et al. . | |
| 4,292,061 | 9/1981 | Land . | |
| 4,501,378 | 2/1985 | Berfield . | |
| 4,734,113 | 3/1988 | Takagi et al. . | |
| 4,746,008 | 5/1988 | Heverly et al. . | |
| 4,938,513 | 7/1990 | Gunderson . | |
| 5,097,971 | 3/1952 | Straub | 220/354 |
| 5,100,015 | 3/1992 | VanDerstuyf | 220/326 |
| 5,193,705 | 3/1993 | McCallum et al. | 220/354 |

Primary Examiner—Joseph Man-Fu Moy
Attorney, Agent, or Firm—Charles K. Veenstra

[57] ABSTRACT

An engine air cleaner housing has a snap latch closure that secures the housing cover on the housing base. To form the snap latch closure, the base has a depending retaining wall, a pair of lateral projections at opposite ends of the retaining wall, and a cross bar interconnecting the lateral projections. The retaining wall, lateral projections and cross bar define a rectangular opening which receives a U-shaped tongue extending from the cover. The tongue includes a firm leg depending adjacent the retaining wall, a flexing leg adjacent the cross bar, a cam surface formed on the flexing leg and engaging the cross bar to deflect the flexing leg as the tongue is received in the opening, and a barb that snaps into engagement with the cross bar after the tongue is fully received in the opening. Engagement of the barb with the cross bar serves to retain the tongue in the opening. Engagement between the depending wall and the firm leg prevents pivotal motion of the tongue within the opening that might otherwise reduce air filter seal compression or release the barb from the cross bar.

2 Claims, 2 Drawing Sheets

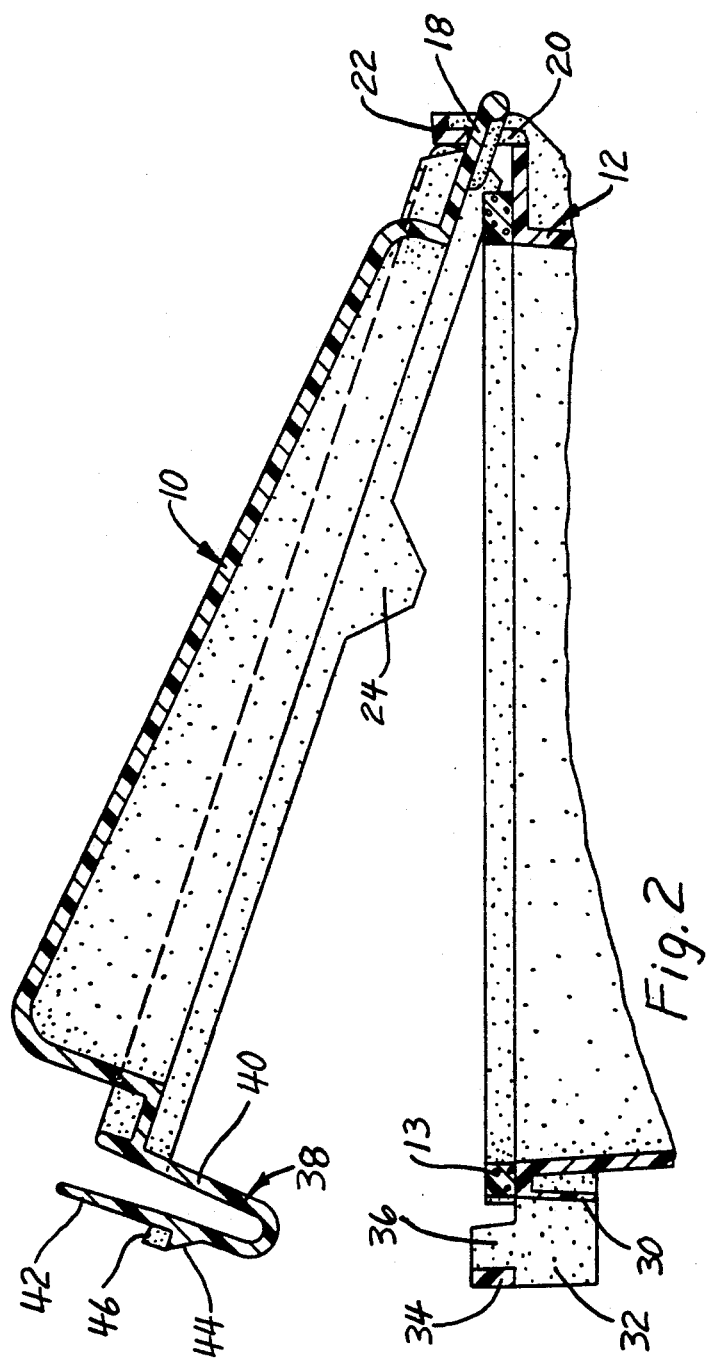
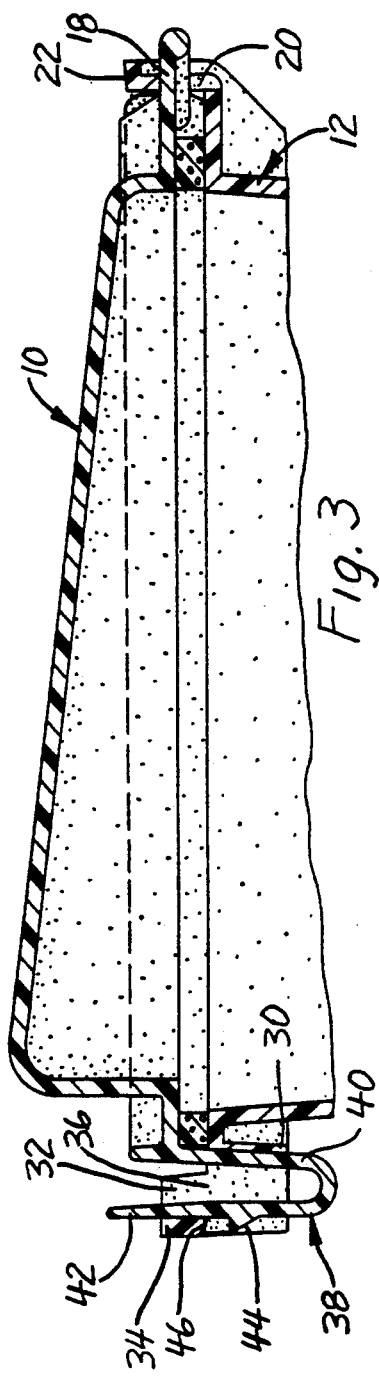

HOUSING WITH SNAP LATCH CLOSURE

TECHNICAL FIELD

This invention relates to a snap latch closure for a housing. This snap latch is particularly suitable for retaining the cover on the base of an engine air cleaner housing.

SUMMARY OF THE INVENTION

An engine air cleaner housing generally comprises a cover and a base that contain an air filter element. The cover must be removed from the base to allow periodic replacement of the filter element. This invention provides a latch that may be released to allow the cover to be removed from the base, but that reliably retains the cover on the base during engine operation.

The details as well as other features and advantages of a preferred embodiment of this invention are set forth in the remainder of the specification and are shown in the accompanying drawings.

SUMMARY OF THE DRAWINGS

FIG. 2 is a sectional view, indicated generally by the line 2—2 of FIG. 1, showing the housing cover and base in a partially assembled condition.

FIG. 3 is a sectional view, similar to the view of FIG. 2, showing the housing cover and base in a fully assembled condition.

THE PREFERRED EMBODIMENT

Figure 1:
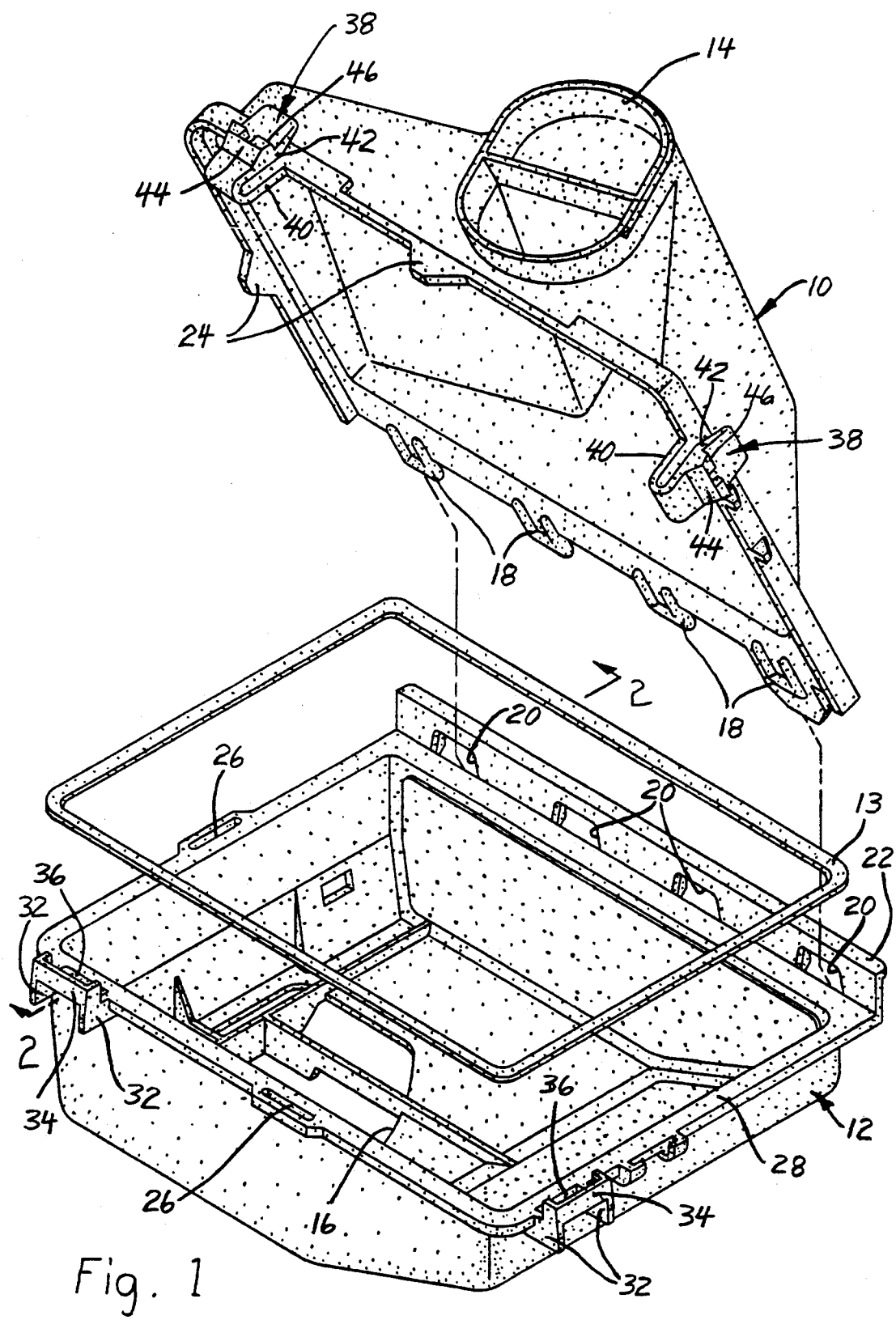
FIG. 1 is an exploded view of a housing employing a snap latch closure provided by this invention.

Referring to the drawings, an engine air cleaner housing includes a cover 10 and a base 12 sandwiched around a gasket or seal 13. Combustion air for the engine is received through an inlet 16 in base 12, passes through an air filter element (not shown) and is delivered to the engine through an outlet 14 in cover 10.

Cover 10 includes four hinge tabs 18 that are received in slots 20 formed in a wall 22 standing along one edge of base 12. Tabs 18 and slots 20 provide a pivoting or hinge connection between cover 10 and base 12.

Cover 10 also includes a pair of alignment tabs 24 that are received in slots 26 formed in the rim 28 of base 12. Tabs 24 and slots 26 provide lateral alignment between cover 10 and base 12.

At two locations around the rim 28 of base 12, a depending retaining wall 30 extends between a pair of lateral projections 32 connected by a cross bar 34.

In each case, retaining wall 30, lateral projections 32 and cross bar 34 define a rectangular opening 36.

Cover 10 has a pair of U-shaped tongues 38 received in openings 36. Each tongue 38 has a firm leg 40 depending adjacent retaining wall 30, and a flexing leg 42 extending upwardly adjacent cross bar 34. Each leg 42 includes a cam surface 44 that engages cross bar 34 to deflect leg 42 inwardly as tongue 38 is received in opening 36. Each leg 42 also includes a barb 46 that snaps into engagement with cross bar 34 after tongue 38 is fully received in opening 36; engagement between barb 46 and cross bar 34 assures that tongue 38 will be retained in opening 36.

The U-shaped configuration of tongues 38 helps to pilot tongues 38 into openings 36 during assembly. The reverse angle on the tops of barbs 46 and the bottoms of retaining bars 34 assists engagement and retention of barbs 46 with retaining bars 34.

Tongues 38 may be released by pressing inwardly on legs 42 so barbs 46 clear retaining bars 34, thereby allowing cover 10 to be removed from base 12.

The compressive loads of the air filter element with the housing, tend to force cover 10 away from base 12, and accordingly tend to cause tongues 38 to pivot about the junction of barbs 46 and barbs 34. If tongues 38 were allowed to pivot compression of the air filter seal would reduce, possibly allowing air to leak past the seal. Continued rotation would reduce engagement between barbs 46 and retaining bars 34 possibly allowing barbs 46 to clear retaining bars 34, thereby releasing tongues 38.

However, engagement of retaining wall 30 with legs 40 prevents pivoting of tongues 38 and thereby assures that tongues 38 will be retained in openings 36.

The embodiment of the invention in which an exclusive property or privilege is claimed is defined as follows:

1. A housing with a snap latch closure comprising
   a base having a depending retaining wall, a pair of lateral projections at opposite ends of the retaining wall, and a cross bar interconnecting the lateral projections, the retaining wall, lateral projections and cross bar defining a rectangular opening,
   and a cover having a U-shaped tongue received in the opening, the tongue including a firm leg depending adjacent the retaining wall, a flexing leg adjacent the cross bar, a cam surface formed on the flexing leg and engaging the cross bar to deflect the flexing leg as the tongue is received in the opening, and a barb that snaps into engagement with the cross bar after the tongue is fully received in the opening, engagement of the barb with the cross bar serving to retain the tongue in the opening,
   and wherein engagement between the depending wall and the firm leg prevents pivotal motion of the tongue within the opening that might otherwise release the barb from the cross bar.

2. A housing with a pair of snap latch closures comprising
   a generally rectangular base having a wall along one edge, the wall including a plurality of slots,
   and a generally rectangular cover having a plurality of hinge tabs received in the slots to provide a pivoting connection between the cover and the base,
   the base further having a pair of rectangular openings each defined by a depending retaining wall, a pair of lateral projections at opposite ends of the retaining wall, and a cross bar interconnecting the lateral projections, one of the openings being located along the edge of the base opposite the slotted wall, the other opening being located along another edge,
   the cover further having a pair of U-shaped tongues received in the openings, each tongue including a firm leg depending adjacent the associated retaining wall, a flexing leg adjacent the associated cross bar, a cam surface formed on the flexing leg and engaging the associated cross bar to deflect the flexing leg as the tongue is received in the opening, and a barb that snaps into engagement with the associated cross bar after the tongue is fully received in the opening, engagement of the barb with the associated cross bar serving to retain the tongue in the opening,
   and wherein engagement between the depending walls and the firm legs prevents pivotal motion of the tongues within the openings that might otherwise release the barbs from the cross bars.

* * * * *